Nov. 1, 1960 — E. S. MOYER — 2,958,198
HYDRAULIC ACTUATING SYSTEM
Filed Oct. 28, 1959 — 2 Sheets-Sheet 1

INVENTOR.
ELTON S. MOYER
BY D. C. Staley
ATTORNEY

Nov. 1, 1960  E. S. MOYER  2,958,198
HYDRAULIC ACTUATING SYSTEM
Filed Oct. 28, 1959  2 Sheets-Sheet 2

INVENTOR.
ELTON S. MOYER
BY
ATTORNEY

United States Patent Office 2,958,198
Patented Nov. 1, 1960

2,958,198

HYDRAULIC ACTUATING SYSTEM

Elton S. Moyer, Dayton, Ohio, assignor to General Motors Corporation, Detroit, Mich., a corporation of Delaware Filed Oct. 28, 1959, Ser. No. 849,391

7 Claims. (Cl. 60—54.6)

This invention relates to a hydraulic actuating system for use on a motor vehicle and particularly to a system adapted for operating the hydraulic brakes on the vehicle as well as a second hydraulic component on the vehicle, such as the clutch.

One of the problems of maintenance of hydraulic systems on motor vehicles is insurance of sufficient volume of hydraulic fluid in the brake system for positive brake operation of the vehicle. Conventionally, the hydraulic brake on a motor vehicle is a self-contained system in that it includes a storage container for hydraulic fluid that supplies fluid to the master cylinder and to the brake lines and wheel cylinders of the hydraulic brake system to maintain the system completely full of fluid at all times. In the conventional system the storage container is in fluid connection with the master cylinder of the hydraulic brake system so that when the master cylinder piston moves to its retracted position, upon release of the brakes, hydraulic fluid from the storage reservoir can flow to the master cylinder to make up for any loss of fluid occurring from the hydraulic system resulting from leaks in the system. Ultimately, if the hydraulic system leaks, the fluid in the storage container is depleted so that additional stroking of the master cylinder results in loss of fluid from the master cylinder without possibility of make-up whereby the brake system becomes ineffective. This can occur without warning to the operator of the vehicle.

Since it is also conventional on motor vehicles, particularly on truck installations, to have other hydraulically operated components, and in particular hydraulically operated clutch mechanisms, it is an object of this invention to interconnect the hydraulic system for the auxiliary components on the motor vehicle with the brake system in such a manner that fluid loss from the hydraulic brake system will ultimately show up as a failure of proper operation of the auxiliary hydraulic component. This will give the operator of the vehicle a warning that the hydraulic system is losing fluid and should be inspected before complete loss of fluid has occurred such as will result in ineffective operation of the hydraulic brake system.

It is another object of the invention to provide a hydraulic system for operating the brakes of a vehicle and also a second hydraulically operated component on the vehicle wherein hydraulic fluid is adapted to be delivered from the second hydraulically operated component into the brake system so that loss of hydraulic fluid from either the hydraulic brake system or that for the auxiliary component will result in failure of the auxiliary component before the hydraulic fluid from the brake system is completely depleted to give warning to the operator of the vehicle to the condition of the fluid loss of the system and to insure brake operation for a time period after the hydraulic fluid has been lost from the system.

More specifically, it is an object of the invention to provide a hydraulic system for operating the brakes of a vehicle that includes a master cylinder and piston assembly in fluid connection with a storage container from which the master cylinder receives hydraulic fluid for make-up of loss of fluid in the hydraulic brake system in the event of loss of fluid from the system and which includes a second hydraulic cylinder and piston assembly for operating a second hydraulic component on the vehicle, such as the clutch of the vehicle, with the second cylinder and piston assembly being in fluid connection with the storage container or reservoir for the hydraulic brake system in a manner to receive fluid from the storage container for make-up of hydraulic fluid in the event fluid is lost from the hydraulic system which includes the second cylinder and piston assembly. The arrangement is such that so long as the hydraulic fluid in the storage container is above a predetermined low depletion level, the cylinders for both the brake system and the auxiliary component can receive make-up fluid from the main storage supply in the storage container. However, the second cylinder and piston assembly for the auxiliary component is arranged such that hydraulic fluid is delivered from the second hydraulic cylinder and piston assembly, and particularly from the pressure producing chamber of the auxiliary cylinder, into a sump chamber for the master cylinder of the brake system whenever the piston of the auxiliary cylinder moves forward on a pressure producing stroke and continues such delivery when the hydraulic fluid in the storage container falls below the predetermined low depletion level to insure forced fluid delivery from the auxiliary hydraulic cylinder and piston assembly into the sump chamber for the master cylinder to deplete the auxiliary cylinder of fluid. This results in improper operation of the auxiliary hydraulic component to give warning to the operator of the vehicle that hydraulic fluid is being lost, and at the same time insure continued proper operation of the hydraulic brake system for a short time period after the warning is given to the operator.

Further objects and advantages of the present invention will be apparent from the following description, reference being had to the accompanying drawings wherein preferred embodiments of the present invention are clearly shown.

Figure 1:
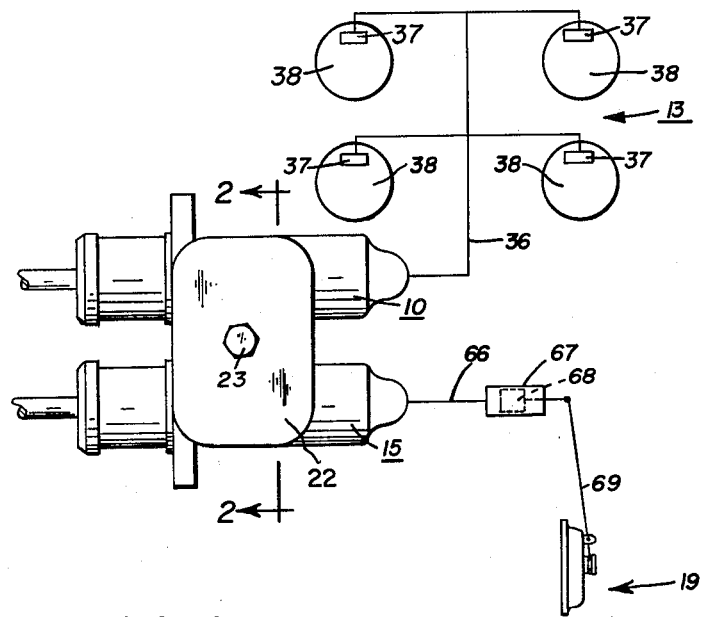
Fig. 1 is a plan view of a dual hydraulic cylinder and piston assembly incorporating features of this invention.

In this invention a master cylinder and piston assembly 10 consisting of the master cylinder 11 and the master cylinder piston 12 is provided for operating a hydraulic brake system 13. A second or auxiliary cylinder and piston assembly 15 consisting of the cylinder 16 and the piston 17 is adapted to operate a hydraulically operated clutch mechanism 19.

The master cylinder and piston assembly 10 and the auxiliary cylinder and piston assembly 15 are integrally cast with a storage container or reservoir 20 containing a body of hydraulic fluid 21 provided for supply to the master cylinder and piston assembly 10, as well as the auxiliary cylinder and piston assembly 15. The storage container 20 is provided with a cover member 22 secured in position by a retaining bolt 23.

The master cylinder and piston assembly 10 that includes the cylinder 11 has a cylinder bore 25 that receives the master cylinder piston 12 for reciprocation therein. The master cylinder piston 12 consists of a forward piston portion 12a and a rearward piston portion 12b interconnected by a stem portion 12c thereby forming an annular chamber 26 between the piston portions 12a and 12b. The forward piston portion 12a of the master cylinder piston 12 has a cup seal 27 disposed against the forward face 28 of the piston 12 with a cup-shaped multiple finger lip expander 29 positioned within the cup seal 27 and retained thereagainst by a compression spring 30 disposed between the expander 29 and a residual pressure check valve 31 at the forward end of the cylinder 11. The residual pressure check valve 31 consists of a cup-shaped element 32 having a plurality of holes 33 therein normally closed by a flap valve 34 that allows hydraulic fluid to flow into the discharge port 35 for delivery into the hydraulic line 36 that connects with the wheel cylinders 37 of the hydraulically actuated brakes 38. The cup-shaped member 32 seats upon a rubber washer member 32a by means of the compression spring 30. The member 32 is adapted to be lifted from the seat member 32a during the retraction stroke of the master cylinder piston 12, the hydraulic fluid under pressure in the hydraulic line 36 causing the member 32 to lift from the seat 32a for return of hydraulic fluid to the master cylinder bore 25.

The end portion 12b of the master cylinder piston 12 has a seal element 39 to close the chamber 26. A snap ring stop member 40 is placed in the left-hand end of the master cylinder bore 25 for positioning of the master cylinder piston at full retraction stroke as urged against the stop by the spring 30. A manually operated rod member 42 engages a recess 43 in the end of the master cylinder piston 12 to effect forward movement of the piston 12 into the cylinder 11 toward valve member 31 upon operation of the brake pedal of the vehicle by the operator.

Figure 4:
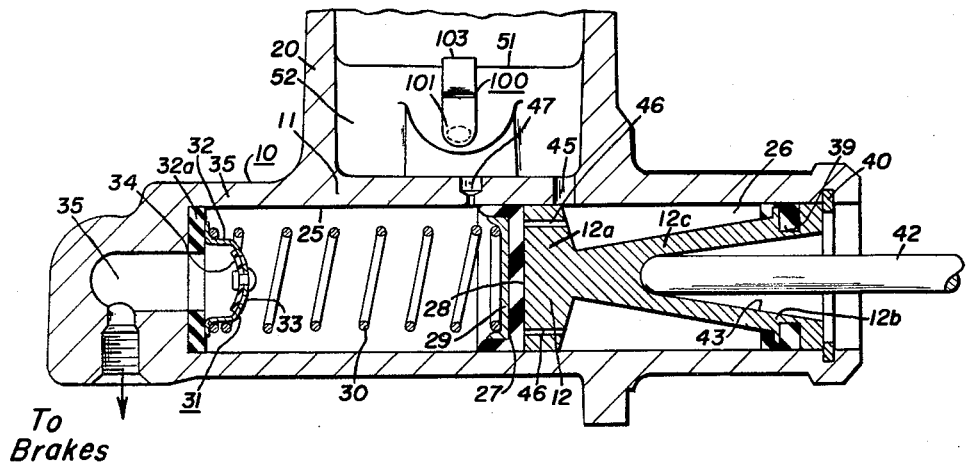
Fig. 4 is a vertical cross-sectional view taken substantially along line 4—4 of Fig. 2 illustrating the master cylinder assembly for the vehicle brake system.

The master cylinder bore 25 is in fluid communication with the reservoir chamber 20 by means of a port 45 that connects with the chamber 26, as shown in Fig. 4. A plurality of axially extending ports 46 are provided in the master cylinder piston portion 12a so that during a retraction stroke of the piston 12, movement away from valve 31, hydraulic fluid can flow from the chamber 26 through the ports 46 and around the periphery of the cup seal 27 into the pressure producing chamber of the master cylinder bore on the left-hand side of the piston portion 12a, as viewed in Fig. 4, to prevent cavitation in the master cylinder bore in the event of a rapid retraction stroke.

A second port 47 is provided between the reservoir chamber 20 and the pressure producing chamber of the master cylinder bore 25 just beyond the left-hand edge of the lip of the cup seal 27, Fig. 4, which either allows excess fluid to be returned to the reservoir chamber 20 at the end of the retraction stroke, or provides for final compensation of the filling of the pressure producing chamber of the master cylinder bore when the master cylinder piston 12 is in the position illustrated in Fig. 4.

Figure 2:
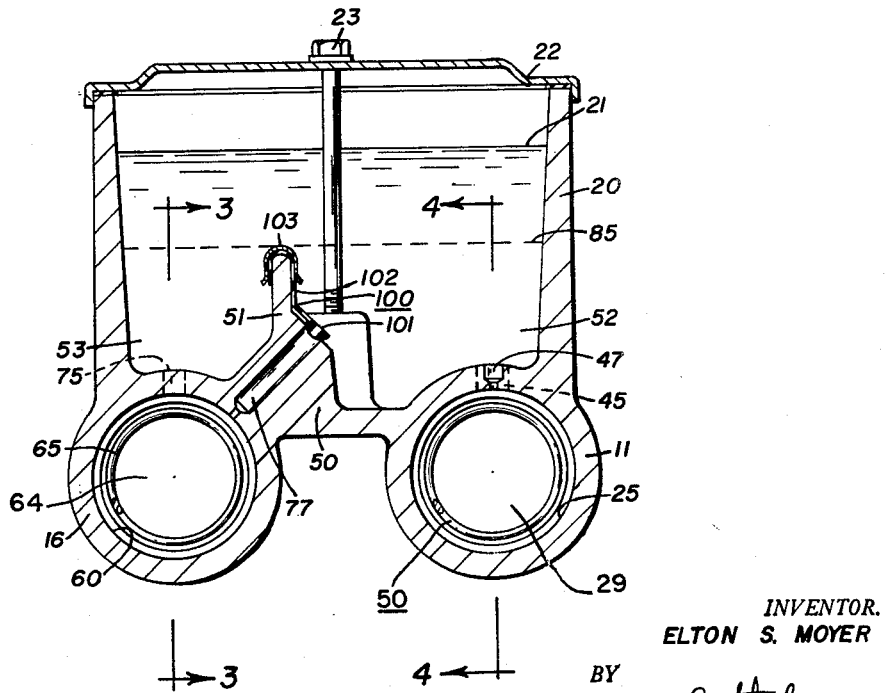
Fig. 2 is a transverse cross-section view taken along line 2—2 of Fig. 1 illustrating a master cylinder and piston assembly for operating hydraulic brakes and a second or auxiliary cylinder and piston assembly for operating a second hydraulic component such as a hydraulically operated clutch mechanism.

The storage container, or reservoir 20, has the bottom wall 50 thereof provided with a vertically positioned dam 51 that divides the lower portion of the reservoir chamber into separate sump chambers 52 and 53. The sump chamber 52 is in fluid communication with the master cylinder bore 25 through the ports 45 and 47 continuously, as shown in Fig. 2. Thus, so long as any hydraulic fluid is in the sump chamber 52, the master cylinder will receive make-up hydraulic fluid to retain the brake system filled with hydraulic fluid and thereby retain the brake system in proper operating condition.

The auxiliary or second hydraulic cylinder and piston assembly 15 comprising the cylinder 16 has a cylinder bore 60 that receives the piston 17 for reciprocation therein. The piston 17 consists of a forward piston portion 17a and a rearward piston portion 17b interconnected by a stem portion 17c thereby forming an annular chamber 71 between the piston portions 17a and 17b. The piston portion 17a has a cup seal 62 positioned against the forward face 63 thereof. A cup-shaped multiple finger lip expander 64 is placed within the cup seal 62 and is retained in position by the compression spring 65. Forward or rightward movement of the piston 17 displaces hydraulic fluid from the cylinder bore 60 through the discharge port 95 into the hydraulic line 66 that supplies a hydraulic slave cylinder 67 with fluid under pressure to operate the piston 68 therein, which, in turn, operates the actuating arm 69 of the hydraulically operated clutch 19. The clutch 19 may be of conventional design.

The piston portion 17b of the auxiliary piston 17 has a seal member 70 which closes the chamber 71 provided annularly around the stem 17c that interconnects the piston portions 17a and 17b.

The chamber 71 of the auxiliary piston and cylinder assembly 15 is in fluid connection with the sump chamber 53 of the storage container 20 through the port passage 75 for fluid supply to the auxiliary cylinder 16. The piston portion 17a is provided with a plurality of axially extending passages 78 for flow of fluid from chamber 71 into the pressure producing chamber ahead of the piston 17 by flow around the periphery of the lip seal 62 during retraction movement of piston 17 in cylinder 16 away from valve 31.

Figure 3:
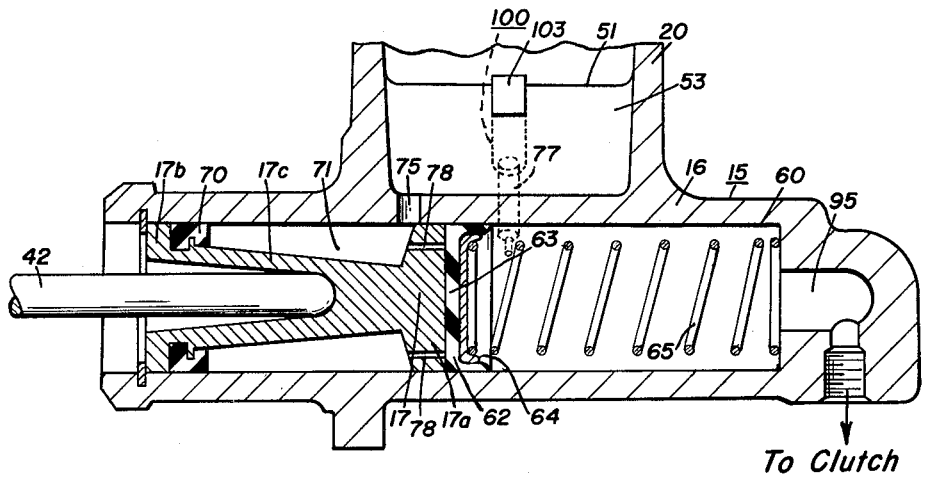
Fig. 3 is a vertical cross-sectional view taken along line 3—3 of Fig. 2 illustrating the auxiliary cylinder and piston assembly.

The auxiliary cylinder 16 also has a port 77 in the wall of the dam 51 extending upwardly from the pressure producing chamber of the auxiliary cylinder bore 60 at the right-hand side of piston portion 17a, as viewed in Fig. 3, into fluid connection with the sump chamber portion 52 of the storage container. Passage 77 is positioned just forward of the lip edge 62a of the cup seal 62 so that the port 77 will be passed by the cup seal upon a short forward movement of the piston 17 on a pressure producing stroke toward outlet passage 65.

Thus, each time piston 17 moves forward on a pressure producing stroke in the pressure producing chamber of cylinder 16, a small predetermined volume of hydraulic fluid will be discharged from the pressure producing chamber through port 77 into the sump chamber 52 for the master cylinder 11, thereby providing constantly for delivery of a small volume of hydraulic fluid from cylinder 16 to the sump chamber 52.

A check valve member 100 consisting of a valve element 101 seats on the discharge end of port 77 to prevent return flow of hydraulic fluid from sump chamber portion 52 into the pressure producing chamber of cylinder 16. Thus, a one-way fluid flow is established. The valve element 101 is formed on the end of a flexible rubber-like flap or stem 102 formed over the top edge of dam 51 and secured in position by a retaining clip 103.

So long as the hydraulic fluid level is above a predetermined low depletion level established by the top edge of the dam 51, as indicated by the dotted line 85, the auxiliary cylinder and piston assembly receives fluid from the main fluid supply 21 in the reservoir or storage container 20 through the passage 75 and thence through the passages 78 and around the periphery of the cup seal 62 in the same manner that the master cylinder 10 receives its supply of hydraulic fluid from the reservoir through the port 45 and normally functions in the same manner.

Under normal conditions of operations, with the hydraulic fluid level in the storage container normally maintained above the predetermined low depletion level, the hydraulic fluid discharged from the pressure producing chamber 60 of the auxiliary cylinder 15 on rightward movement of the auxiliary piston 17 will be delivered into the main supply of hydraulic fluid in the chamber 20, the pumped fluid merely circulating.

However, should a leak develop in the hydraulic brake system 36 with loss of hydraulic fluid, the fluid level in the reservoir chamber 20 ultimately falls to the predetermined low depletion level 85, at which time the top edge of the dam 51 separates the hydraulic fluid in the chamber 20 into two portions, one in the sump chamber 52 and another in the sump chamber 53.

When this occurs, continued pumping of fluid from cylinder 16 to sump chamber 52, as heretofore described, finally depletes the fluid in sump chamber 53 and also in the cylinder 16. When this occurs, insufficient fluid in the clutch operating system results in erratic operation of the clutch to give the operator of the vehicle warning that hydraulic fluid is being lost.

It will be obvious that the hydraulic brake system will continue to function properly even though it has been the cause of loss of hydraulic fluid, and will continue to operate for a short time period until the hydraulic fluid in the sump chamber 52 is fully depleted. However, the warning given to the operator of the vehicle by failure of the auxiliary or second hydraulically operated component should produce an inspection of the hydraulic system before the brake system fails completely.

While the embodiments of the present invention as herein disclosed constitute a preferred form, it is to be understood that other forms might be adopted.

What is claimed is as follows:

1. In a motor vehicle including a hydraulic system for operating the brakes of the vehicle and a second hydraulic system for operating a second component of the vehicle, the combination of, a storage container for hydraulic fluid having a main chamber portion and separate sump chamber portions below the main chamber portion, a master cylinder and piston assembly for operating the vehicle brakes in fluid connection with one of said sump chamber portions for supply of fluid thereto, a second hydraulic cylinder and piston assembly for operating said second component, said second cylinder having first port means fluid connecting said second cylinder with the other of said sump chambers for fluid supply to said second cylinder and having second port means fluid connecting said second cylinder with said one sump chamber for exhaust of a part of the fluid in said second cylinder into said one sump chamber on each fluid displacement movement of the piston in said second cylinder, and valve means in said second port connection preventing return fluid flow from said one sump chamber into said second cylinder, whereby said second cylinder and piston assembly constantly pumps fluid from said other sump chamber to said one sump chamber to maintain fluid in said one sump chamber at the expense of depletion of fluid in said other sump chamber upon fluid leakage from the hydraulic brake system to insure thereby normal vehicle brake operation at the expense of faulty operation of the second component whereby to warn the operator of the fluid leakage.

2. In a motor vehicle including a hydraulic system for operating the brakes of the vehicle and a second hydraulic system for operating a second component of the vehicle, the combination of, a storage container for hydraulic fluid having wall means extending upwardly from the bottom wall of the storage container part way to the top of the container thereby forming separate sump chamber portions in the bottom portion of the storage container that are in fluid interflow connection so long as the fluid level in the storage container is above the level of the said wall means with the fluid in the said sump chamber portions being separated whenever the fluid level in the storage chamber is depleted to a level below the top edge of the said wall means, a master cylinder and piston assembly for operating the vehicle brakes in fluid connection with one of said sump chamber portions for supply of fluid thereto, a second hydraulic cylinder and piston assembly for operating said second component, said second cylinder having first port means fluid connecting said second cylinder with the other of said sump chambers for fluid supply to said second cylinder and having second port means fluid connecting said second cylinder with said one sump chamber for exhaust of a part of the fluid in said second cylinder into said one sump chamber on each fluid displacement movement of the piston in said second cylinder, and valve means in said second port connection preventing return fluid flow from said one sump chamber into said second cylinder, whereby said second cylinder and piston assembly constantly pumps fluid from said other sump chamber to said one sump chamber to maintain fluid in said one sump chamber at the expense of depletion of fluid in said other sump chamber upon fluid leakage from the hydraulic brake system to insure thereby normal vehicle brake operation at the expense of faulty operation of the second component whereby to warn the operator of the fluid leakage.

3. A structure constructed and arranged in accordance with claim 2 wherein the said valve means in said second port connection comprises a check valve carried on said wall means and closes the terminus end of the said second port means at point of discharge into said one sump chamber.

4. In a motor vehicle including a hydraulic system for operating the brakes of the vehicle and a second hydraulic system for operating a second component of the vehicle, the combination of, a storage container for hydraulic fluid having a main chamber portion and separate sump chamber portions below the main chamber portion, a master cylinder and piston assembly for operating the vehicle brakes in fluid connection with one of said sump chamber portions for supply of fluid thereto, a second hydraulic cylinder and piston assembly for operating said second component, said second cylinder having first port means fluid connecting said second cylinder with the other of said sump chambers for fluid supply to said second cylinder and having a second port means in the pressure producing chamber thereof fluid connecting the pressure producing chamber of said second cylinder with said one sump chamber for exhaust of a part of the fluid from the pressure producing chamber into said one sump chamber on each fluid displacement movement of the piston in the pressure producing chamber of said second cylinder, and valve means in said second port connection preventing return fluid flow from said one sump chamber into said second cylinder, whereby said second cylinder and piston assembly constantly pumps fluid from said other sump chamber to said one sump chamber to maintain fluid in said one sump chamber at the expense of depletion of fluid in said other sump chamber upon fluid leakage from the hydraulic brake system to insure thereby normal vehicle brake operation at the expense of faulty operation of the second component whereby to warn the operator of the fluid leakage.

5. In a motor vehicle including a hydraulic system for operating the brakes of the vehicle and a second hydraulic system for operating a second component of the vehicle, the combination of, a storage container for hydraulic fluid having wall means extending upwardly from the bottom wall of the said storage container part way to the top of the container thereby forming a main chamber portion above a level of the top edge of of the said wall means and separate sump chamber portions below the top level of the said wall means, the said separate sump chamber portions being in fluid intercommunication so long as the liquid level in the storage container is above the level of the said wall means with the fluid in the said sump chambers being separated when the fluid in the storage container is depleted to the upper level of the said wall means, a master cylinder and piston assembly for operating the vehicle brakes in fluid connection with one of said sump chamber portions for supply of fluid thereto, a second hydraulic cylinder and piston assembly for operating said second component, said second cylinder having first port means fluid connecting said second cylinder with the other of said sump chambers for fluid supply to said second cylinder and having second port means in the pressure producing chamber thereof extending through the said wall means fluid connecting the pressure producing chamber of said second cylinder with said one sump chamber for exhaust of a part of the fluid from the pressure producing chamber into said one sump chamber on each fluid displacement movement of the piston in the pressure producing chamber of said second cylinder, and valve means in said second port connection preventing return fluid flow from said one sump chamber into the pressure producing chamber of said second cylinder, whereby said second cylinder and piston assembly constantly pumps fluid from said other sump chamber to said one sump chamber to maintain fluid in said one sump chamber at the expense of depletion of fluid in said other sump chamber upon fluid leakage from the hydraulic brake system to insure thereby normal vehicle brake operation at the expense of faulty operation of the second component whereby to warn the operator of the fluid leakage.

6. A structure as set forth in claim 5 wherein the said valve means in said second port connection comprises check valve means carried on said wall means and closing the discharge terminus end of the said second port connection.

7. In a motor vehicle including a hydraulic system for operating the brakes of the vehicle and a second hydraulic system for operating a second component of the vehicle, the combination of, a storage container for hydraulic fluid having a main chamber portion and separate sump chamber portions below the main chamber portion in fluid interflow connection so long as the liquid level in the storage container is above a predetermined low depletion level established by wall means extending upwardly into the storage container from the bottom wall thereof whereafter the said sump chamber portions are retained separate, a master cylinder and piston assembly for operating the vehicle brakes in fluid connection with one of said sump chamber portions for supply of fluid thereto at all times, a second hydraulic cylinder said piston assembly for operating said second component, said piston of said second hydraulic cylinder and piston assembly dividing said second cylinder into a pressure producing chamber at one side of the piston and a second chamber at the opposite side of the piston, passage means in said piston fluid connecting said chambers and closed by seal means preventing pressure fluid in the said pressure producing chamber flowing to said second chamber but permitting flow of fluid from said second chamber into said pressure producing chamber on depletion of fluid pressure in the pressure producing chamber, said second cylinder having first port means continuously fluid connecting said second chamber with the other of said sump chambers for fluid supply to said second chamber and having second port means in the pressure producing chamber thereof fluid connecting the pressure producing chamber of said second cylinder with said one sump chamber when the piston in said second cylinder is in full retracted position for exhaust of fluid from the pressure producing chamber in said second cylinder into said one sump chamber on each fluid displacement movement of the piston in the pressure producing chamber until said second port means is passed by said piston in its fluid displacement movement, and valve means in said second port connection preventing return fluid flow from said one sump chamber into the pressure producing chamber of said second cylinder when the piston thereof is in full retracted position, whereby said second cylinder and piston assembly constantly pumps fluid from said other sump chamber to said one sump chamber to maintain fluid in said one sump chamber at the expense of depletion of fluid in said other sump chamber upon fluid leakage from the hydraulic brake system to insure thereby normal vehicle brake operation at the expense of faulty operation of the second component whereby to warn the operator of the fluid leakage.

No references cited.